United States
Channin

[11] B 3,981,559
[45] Sept. 21, 1976

[54] LIQUID CRYSTAL DISPLAY

[75] Inventor: Donald Jones Channin, Princeton, N.J.

[73] Assignee: RCA Corporation, Princeton, N.J.

[22] Filed: Nov. 25, 1974

[21] Appl. No.: 527,054

[44] Published under the second Trial Voluntary Protest Program on February 17, 1976 as document No. B 527,054.

[52] U.S. Cl. .......................................... 350/160 LC
[51] Int. Cl.² ............................................ G02F 1/13
[58] Field of Search ............................. 350/160 LC

[56] References Cited
UNITED STATES PATENTS

| | | | |
|---|---|---|---|
| 3,551,026 | 12/1970 | Heilmeier | 350/160 LC X |
| 3,854,751 | 12/1974 | Haas et al. | 350/160 LC |
| 3,883,227 | 5/1975 | Kobayashi et al. | 350/160 LC |

*Primary Examiner*—Paul L. Gensler
*Attorney, Agent, or Firm*—H. Christoffersen; Samuel Cohen

[57] ABSTRACT

Two independently adjustable fields are employed to control the optical condition of a dielectrically anisotropic liquid crystal. One of the fields $E_x$ may be perpendicular to the initial direction of the liquid crystal molecules and the other $E_y$ parallel thereto. In an array, the $E_x$ field may be employed to select the location in a liquid crystal display that it is desired to excite and the $E_y$ field to control the intensity of the excitation. In one mode of operation, use is made of a newly discovered nonlinear effect for amplifying in a later time period an optical disturbance introduced into the liquid crystal during an earlier time period.

17 Claims, 16 Drawing Figures

LIQUID CRYSTAL DISPLAY

U.S. Pat. No. 3,753,609 to Liebowitz discloses a liquid crystal display system in which an array of X and Y conductors is located outside of, but adjacent to one surface of, a liquid crystal layer, and a planar conductor, termed a biasing electrode, is located adjacent to the opposite surface of the liquid crystal layer. The liquid crystal layer is excited by placing one pair of adjacent X conductors at one voltage level and one pair of adjacent Y conductors at a second voltage level. The fringing field thereby created in the small area surrounded by the two X and the two Y conductors, which field is not in the plane of the liquid crystal layer but which rather extends from outside of the layer into the layer, excites the liquid crystal.

Liebowitz also discloses that the planar conductor when maintained at a given value of alternating voltage, that is, at a given bias level, reduces the drive voltage requirements for the selected pairs of X and Y conductors. Liebowitz does not suggest varying the bias voltage level.

The present invention resides, in part, in the discovery that new modes of liquid crystal operation can be achieved by employing two independently adjustable electric fields. Critical to the discovery is that the two fields be orthogonal and that the liquid crystal molecules be dielectrically anisotropic. The molecules initially are oriented in the plane in which the fields are orthogonal. The invention resides also in the further discovery that if one of the fields $E_x$ is applied for a short period during the presense of the orthogonal field $E_y$ and if at a later time the field $E_x$ is again applied in the absence of the field $E_y$, then the relatively small excitation previously imparted to the liquid crystal becomes greatly amplified. Use is made of these and other discoveries in a number of forms of displays which are described in detail below.

Figure 1:
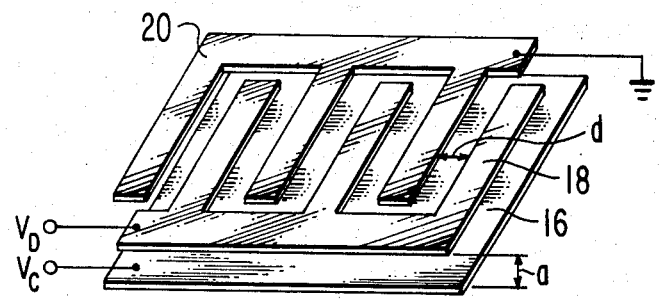
FIG. 1 is a schematic perspective showing of a liquid crystal cell according to an embodiment of the invention.
Figure 2:
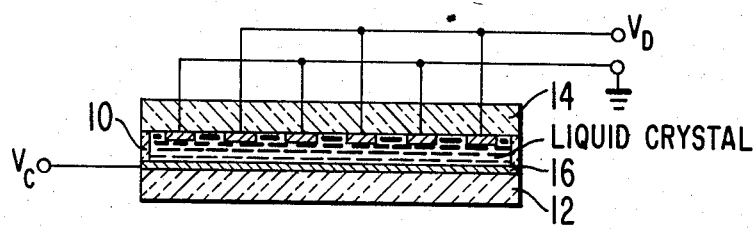
FIG. 2 is a cross section through the cell of FIG. 1.

FIGS. 1 and 2 should be referred to first. A nematic liquid crystal material 10 which is dielectrically anisotropic optically birefringent, and which may be of the field effect type is located between two transparent, e.g. glass plates 12 and 14, as shown in FIG. 2. An example of a suitable liquid crystal is Eastman Kodak Field Effect II No. 14080 which is a positive nematic liquid crystal. To simplify the drawing, the glass plates and liquid crystal layer, while present, are not shown in FIG. 1. A transparent planar electrode 16 is located on the inner surface of glass plate 12 and an interleaved electrode structure 18, 20 is located on the inner surface of glass plate 14. The electrode 20 is connected to a point of reference potential, such as ground, and the electrode 18 is connected to a terminal to which a drive voltage $V_D$ is applied. A control voltage $V_C$ is applied to the planar electrode 16.

Figure 5:
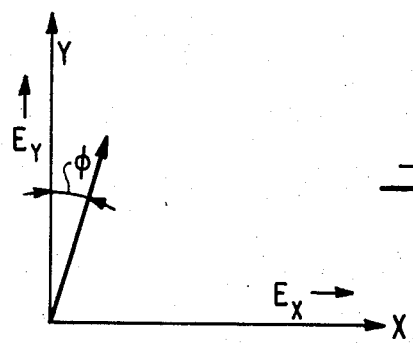
FIGS. 5 and 6 are graphs to illustrate certain properties of a liquid crystal material operated in accordance with the present invention.

In the fabrication of the cell just described, lecithin or organosilane may be used as a surface aligning agent on the glass plates. By treating the surface with one of these materials, the liquid crystal molecules are oriented to lie parallel to the Y axis, that is, at right angles to the plane of the liquid crystal layer. In terms of FIG. 5, the angle $\phi$, which represents the angle of rotation of the molecules in the XY plane, in the center region of the liquid crystal layer, relative to the Y axis in response to various combinations of electric fields, initially is zero or very close to zero.

The optical transmission of the liquid crystal is related to $\phi$ by the polarizing optics (the polarizer 30 and analyzer 32 in the example of FIG. 3) and the liquid crystal birefringence. The polarizer and analyzer initially can be oriented so that when $\phi$ equals zero, no light from source 34 is transmitted to the observer 36. The liquid crystal layer thickness can be chosen such that when the angle $\phi$ reaches a given small angle (such as 10° or so) maximum transmission occurs, that is, maximum light from source 34 reaches the observer 36. As discussed in more detail shortly, rotation of the liquid crystal molecules through such an angle is achieved by the concurrent application of orthogonal electric fields $E_x$ and $E_y$ to the liquid crystal. (Of course, if desired, the polarizer and analyzer can be oriented in such a way that when $\phi = 0$, maximum light transmission occurs and when $\phi$ is equal to a small angle such as 10°, the light is blocked. The choice will depend upon the kind of display desired).

The dielectric anisotrophy $\epsilon_a$ of a liquid crystal material is defined as follows:

$$\epsilon_{||} - \epsilon_{\perp} = \epsilon_a \qquad (1)$$

where:

$\epsilon_{||}$ is the dielectric constant parallel to the molecular axis, and $\epsilon_{\perp}$ is the dielectric constant perpendicular to the molecular axis.

When $\epsilon_a > 0$, the molecules tend to rotate parallel to the electric field and in the example given of the liquid crystal being employed, $\epsilon_a$ is greater than zero. The torque $\Gamma_E$ causing this rotation has the magnitude $$\Gamma_E = -\tfrac{1}{2}\,\epsilon_a\,[(E_x{}^2 - E_y{}^2)\sin 2\phi + 2E_xE_y\cos 2\phi] \qquad (2)$$

The restoring force, that is, the torque opposing this rotation has a magnitude (when $\phi$ is small) of $$\Gamma_e = \frac{\pi^2}{a^2} K_{33}\,\phi \qquad (3)$$

where:

$a$ = thickness of liquid crystal layer $K_{33}$ = an elastic constant

From the equations above, several observations may be made. To start with, when $\phi$ is small, the sine term is small and may be ignored and the cosine term has a value close to one. Accordingly, the torque causing rotation of the liquid crystal molecule is largely a function of the product of the two orthogonal fields $E_x$ and $E_y$ (the term $[2E_xE_y \cos 2\phi] \cong 2E_xE_y$ in equation (2)). If one of these fields is absent, for example, if $E_y = 0$, then this term too reduces to zero. In this case the optical response, if any, will be very small; it will be a function of the first term of equation 2 and will depend upon $E_x$ and the small value of $\sin 2\phi$.

Returning now to FIGS. 1 and 2, the electric field produced at regions of the liquid crystal midway between the interleaved electrode portions 18 and 20 is $$E_x \approx \frac{V_D}{d} \qquad (4)$$

where $d$ is the spacing between fingers

The electric field produced midway between the planar electrode and the interleaved electrode structures is $$E_y \approx \frac{V_D}{2a}\left[1 - 2\frac{V_C}{V_D}\right] \qquad (5)$$

where $a$ is the thickness of the liquid crystal layer.

By controlling the applied voltages $V_D$ and $V_C$, the two electric field components $E_x$ and $E_y$ are independently controlled. For example, when $V_C = \frac{1}{2} V_D$, $E_y = 0$. The electric torque applied to the liquid crystal is therefore also zero and there is therefore no (or minimal) optical response. When $V_D = 0$, $E_x = 0$ and there is also no response despite the presence of $V_C$. The ability to use two elements to independently control the response makes possible scanning and multiplex arrangements for displays based upon arrays of such elements, which have new and unexpected properties. For example, the $E_x$ field produced by the voltage $V_D$ can be employed to select a location it is desired to excite in a liquid crystal array and the $E_y$ field, produced by the control voltage $V_C$, may be used to control the extent of the excitation. These and other properties are discussed in more detail later.

Physically, the independent control of the orthogonal fields $E_x$ and $E_y$, may be viewed as controlling the rotation of the net electric field in the x-y plane. The torque tends to rotate the liquid crystal molecules to lie parallel to the field, and is zero whenever the molecules are parallel or perpendicular to the field. (However, the perpendicular condition is unstable in the sense that any slight departure from the perpendicular of the molecules results in a force on the molecules which tends to orient them in the stable condition, that is, parallel to the field.)

Figure 3:
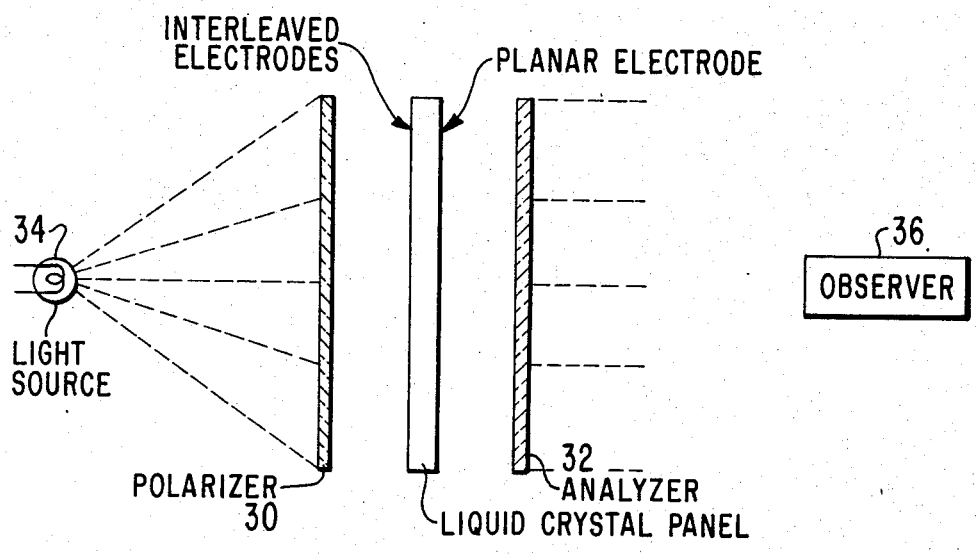
FIGS. 3 and 4 are schematic showings of optical systems for viewing the cell of FIG. 1.
Figure 6:
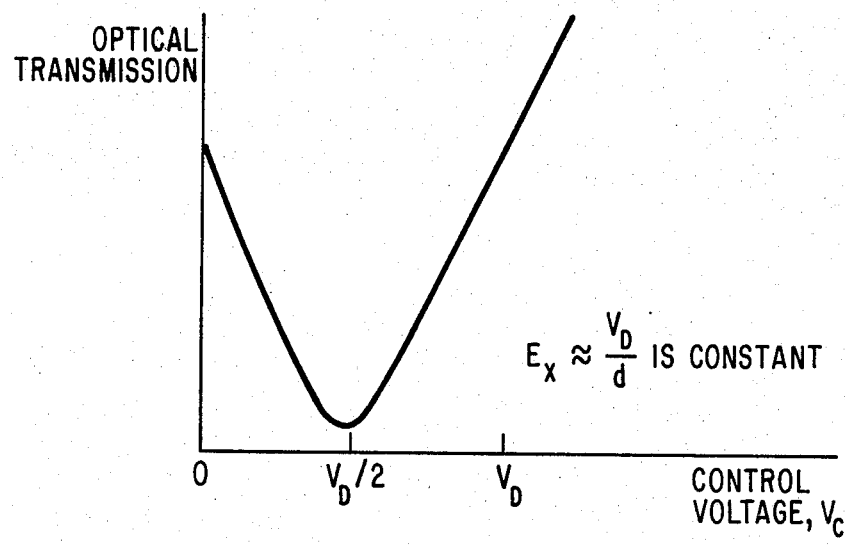

FIG. 6 illustrates the optical transmission obtained with the cell of FIGS. 1 and 2 in the system shown in FIG. 3.

This curve is obtained by assuming $E_x$ to be at some constant value and by substituting different values of voltage for $V_C$ in equation 7. The curve has been verified empirically.

In the operation of the arrangement of FIGS. 1–3, one can operate either on the portion of the curve between zero and $V_D/2$ or between $V_D/2$ and some voltage of greater magnitude than this, either $V_D$ or some value lower or higher than $V_D$, depending upon the amount of excitation desired.

If voltages $V_C$ and $V_D$, in the form of short pulses, are simultaneously applied to the liquid crystal cell and these pulses have a duration $t$, the liquid crystal molecules will be rotated through an angle $\phi(t)$ defined by the following equation.

$$\phi(t) = \left[\phi_0 + \frac{\epsilon_a E_x E_y}{\epsilon_a(E_x^2 - E_y^2) - \frac{\pi^2}{a^2}K_{33}}\right]e^{-\frac{t}{T}}$$

$$- \frac{\epsilon_a E_x E_y}{\epsilon_a(E_x^2 - E_y^2) - \frac{\pi^2}{a^2}K_{33}} \qquad (6)$$

where:

$$T = \frac{\eta}{\epsilon_a(E_x^2 - E_y^2) - \frac{\pi^2}{a^2}K_{33}} \qquad (7)$$

and $\eta$ is the viscosity of the liquid crystal.

Equation (6) helps to explain a very significant form of liquid crystal behavior, which was unexpectedly observed by the present inventor, during the course of an experimental investigation. Assume that initially $E_x$ and $E_y$ are present for a very short interval (say 1 millisecond or less). It already has been shown from equation (2) that under such circumstances $\Gamma_E$ becomes some value other than zero so that $\phi$ (FIG. 5) becomes some small value. The material relaxation time is relatively long so that the angle $\phi$ remains at this small finite value other than zero for a reasonable period of time (of the order of milliseconds or more, depending upon the liquid crystal material and the layer thickness $a$ ). If during this period and while $E_y$ is zero, the field $E_x$ is reapplied to the liquid crystal, then the initial rotation, call it $\phi_1$, will be amplified by the exponential factor $e^{t/T}$, where $t$ is the length of time the field $E_x$ is reapplied. Looking at equation (6), the last term, which has the product $E_xE_y$ in the numerator, reduces to zero. Similarly, the last term within the brackets also reduces to zero for the same reason. This is necessary since $\phi_1$ (that is, $\phi_0$ in the equation) is small at the time $E_x$ is reapplied, and if $$\frac{\epsilon_a E_x E_y}{\epsilon_a(E_x^2 - E_y^2) - \frac{\pi^2}{a^2}K_{33}}$$

were present, it would, swamp out $\phi_0$. Thus equation (6) reduces to $\phi(t) = \phi_0 e^{t/T}$ so that $\phi_t$ increases exponentially with time, that is, as a function of $e$ raised to the power $t/T$.

Figure 7:
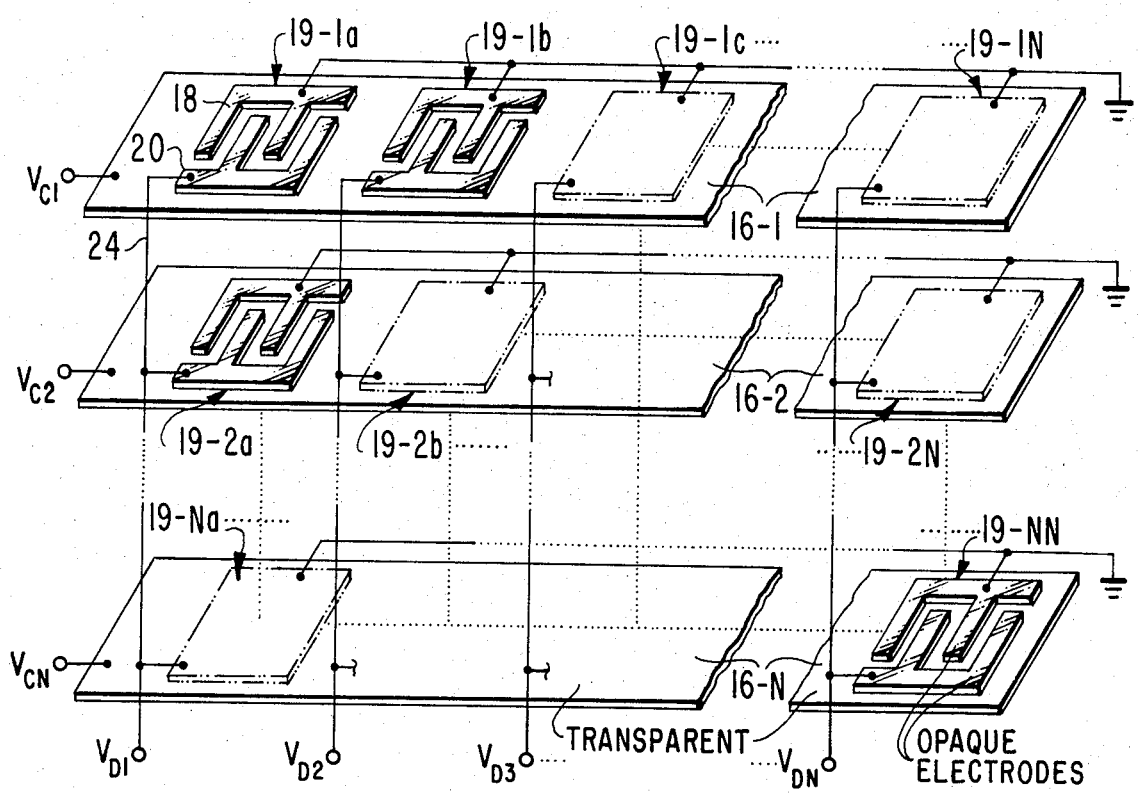
FIG. 7 is a schematic showing of a matrix display embodying the invention.

FIG. 7 illustrates a matrix of elements such as shown in FIG. 1. The liquid crystal, while not shown explicitly, is assumed to be present between the planar and interleaved electrodes. Also, to further simplify the drawing, the interleaved electrodes in some cases are illustrated by squares.

The planar electrodes 16-1, 16-2 . . . 16-N form the rows of the array. The corresponding portions 20 of the interleaved electrodes in the several rows are interconnected to form the columns of the array. The portions 18 of the interleaved electrodes are held at ground potential. The columns of the array are driven by voltages $V_{D1}, V_{D2} \ldots V_{DN}$. The rows (planar electrodes) of the array are driven by voltages $V_{C1}, V_{C2} \ldots V_{CN}$.

Figure 8:
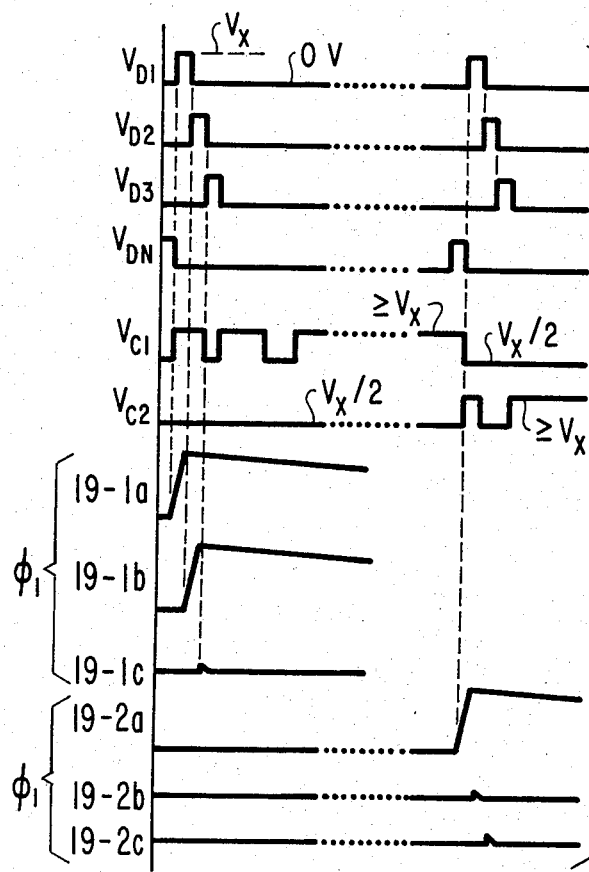
FIG. 8 is a drawing of waveforms to help explain the operation of the display of FIG. 7.

FIG. 8 depicts operation of the display of FIG. 7 in digital fashion. The planar electrodes 16 quiescently may be maintained at $V_X/2$ volts ($V_X$ typically may be in the range 5–20 volts for a thin layer of the material specified). All $V_D$ voltages initially are at zero volts. When an element in a row is to be addressed, the column voltage $V_D$ for that element is raised to $V_X$ and the row voltage $V_C$ for that element is raised to some value greater than $V_X/2$ and preferably equal to or greater than $V_X$ (depending upon the level of excitation desired). $V_C$ is retained at $V_X/2$ if no excitation is desired. (Alternatively, $V_C$ can be made less than $V_X/2$ if excitation is desired). If for example, the voltage $V_{D1}$ applied to column 1 is $V_X$ and the voltage $V_{C1}$ applied to planar electrode 16-1 of row 1 is at $V_X$, the liquid crystal at the selected (column 1, row 1) becomes excited. The remaining elements in column 1 are not affected. These remaining elements receive an electric field $E_X$ (in response to the voltage $V_X$ on column conductor 24); however, $V_{C2} \ldots V_{CN}$ are all at $V_X/2$ so $E_y = 0$. Accordingly, the optical excitation is zero or close to zero. The remaining elements 19-1b ... 19-1n are not excited because the voltage $V_D$ applied to these electrodes is zero so that the $E_X$ field is zero.

The lower portion of FIG. 8 illustrates the magnitude of the angle $\phi$ of rotation of the liquid crystal molecules associated with various ones of the elements 19 in response to the applied voltages illustrated at the top portion of FIG. 8.

It is advantageous in the operation of the display of FIG. 7 to maintain planar electrodes 16 at the quiescent level $V_C = V_X/2$ volts only when needed, that is, when a column voltage $V_D$ is being applied. At other times in a duty cycle $V_C$ may be set to ground potential. This prevents excess power consumption due to electrical conduction through the liquid crystal, and also prevents turbulence in the liquid crystal due to such conduction.

It might be mentioned, in passing, that field $E_y$, when present, in the absence of a field $E_X$, does have a slight effect in reducing the size of angle $\phi$ (if $\phi$ is initially at a value other than zero). Referring to equation (2), when $E_x$ is zero, the last term drops out and the only term remaining within the brackets is $-E_y^2 \sin \phi$. Since, in practice, $\phi$ is small (generally 10° or less) even in the excited condition of the liquid crystal, and since there is substantial mechanical inertia tending to prevent the molecules from quickly returning to their initial alignment, the effect on $\Gamma_E$ is small. In other words, the tendency of the field $E_y$ to reduce the angle $\phi$ at which the liquid crystal molecules are oriented, is small in the absence of the field $E_X$.

A display of the general type just discussed is particularly suitable for a multiplexed numeric or alpha numeric display. For example, it is useful for a multiplexed, seven segment numeric indicator display. Here, a planar electrode such as 16-1 may be the backplate of one of the numeric indicators, each of the elements 19-1a - - - 19-1g would be a separate one of the seven segments, and there would be seven column lines each connecting to a separate segment of the indicator. Each segment would consist of an interleaved electrode structure such as 19-1a, and the seven electrode structures 19-1a ... 19-1g would be physically arranged in the form of a "figure eight", for example. Operation would be similar to that described above, with one row addressed at a time, either by applying the $V_{D1} \ldots V_{D7}$ voltages sequentially or concurrently while the $V_C$ excitation voltage for the row was present.

Figure 9:
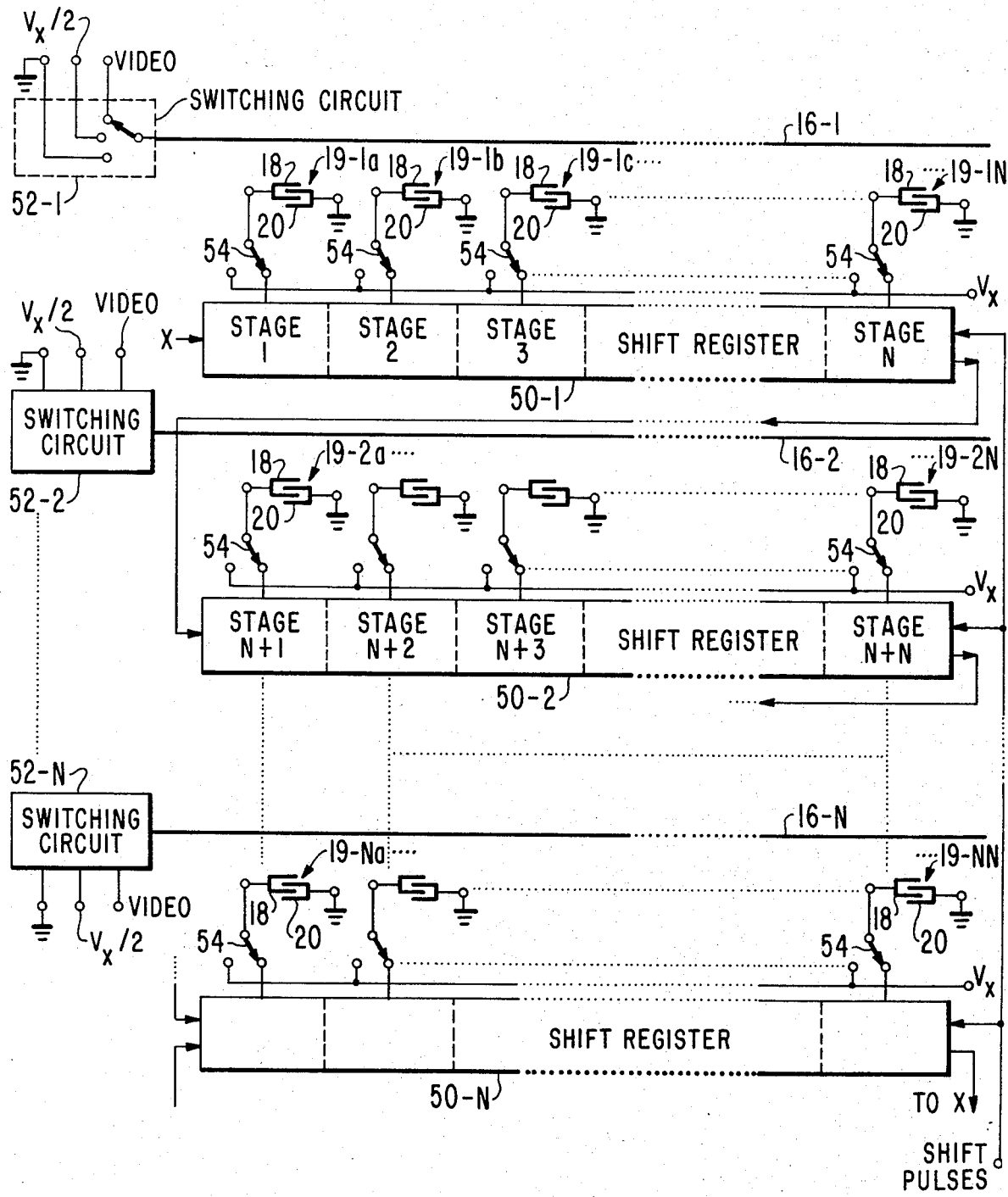
FIG. 9 is a schematic showing of another form of matrix display embodying the invention.

A form of matrix array suitable for operation in the amplification mode is shown in FIG. 9. In this figure, the planar electrodes are illustrated by a single line and the interleaving electrodes are shown schematically.

In FIG. 9, the several elements 19-1a, etc., of interleaving electrodes are arranged in an X, Y array. As in the case of FIG. 1, the interleaving electrodes may be located on one glass plate and the electrode 16 on another, with the field effect liquid crystal located between the two glass plates, just as is shown in cross section in FIG. 2. There is also associated with each row of the array a respective shift register and the various shift registers 50-1, 50-2 ... 50-N are interconnected to form a single ring counter, with the output terminal of the last register 50-N connected back to the input terminal of the first register 50-1. A plurality of switches 54 (which, in practice, are electronic switches such as transistors) connect the various electrodes 18, each to the output of a respective shift register stage.

In operation, a row of the array is loaded at a time. Taking the first row as an example, electrode 16-1 is connected to a source of video signal via switch 52-1. (Here too, an electronic circuit is employed to implement the switch.) During this period, each location 19 is connected through its switch 54 to a different register stage. A source of shift pulses connects to the registers and a single bit of information shifts through the first register 50-1 of the ring counter. When this bit is in a stage such as stage 1, a voltage $V_X$ is applied to electrode 18 of location 19-1a. The other interleaving electrode 20 at that location is at ground. As a result, an electric field $E_X$ is produced, and the video signal present on the backplate 16-1 causes a field $E_y$ to be produced. The liquid crystal molecules at the location 18-1a rotate through a small angle $\phi_1$. The electric field $E_X$ at every other location in the array is zero since all stages other than stage 1 of the register produce an output of zero volts at this time. Accordingly, the liquid crystal molecules at all other locations remain in their initial orientation, that is, $\phi_1$ remains zero.

When the next clock pulse occurs, the bit formerly present in stage one shifts to stage two and the process just described in repeated, that is, the $E_X$ and $E_y$ fields now present at location 19-1b cause a slight change in the angle $\phi_1$, the amount of change depending upon the amplitude of the video signal. This process continues at high speed until each and every location in the first row of the array has been accessed. Then the process is repeated for the second, third and so on rows until the liquid crystal molecules at each location are oriented at various small angles $\phi_1$, depending upon the video information present at the time the electric fields $E_X$ (due to the voltage supplied by the shift register) and $E_y$ (due to the video signals) are present.

After the "write-in" interval for a row as described above, switch 52 for that row is changed to the second position so that the voltage $V_X/2$ is applied to the backplate 16. That is, after the circulating bit passes from register 50-1 to register 50-2, switching circuit 52-1 switches planar electrode 16-1 to the $V_X/2$ voltage terminal (and switching circuit 52-2 switches planar electrode 16-2 to the "video" terminal). At the same time, the switches 54 of the first row are all moved to their second position so that the interleaving electrode 18 at each location in row 1 is placed at a level $V_X$ while the other interleaving electrode 20 at each location in row 1 remains at ground. The result is that in the first row there is a field $E_x$ present at each location and there is zero field $E_y$ present at each location. As already explained, as a result there is an exponential increase in the angle of rotation $\phi_1$ of the liquid crystal molecules at each location in the first row and a corresponding exponential increase in the optical effect. The amount of exponential increase is proportional to the period of time that $V_x$ is applied to the display locations 19 of row 1. In a commercial television application, the write in time for a location (the time during which a register stage applies a voltage) may be 0.1 microsecond and the amplification period may be almost as long as 1/30 second.

After the amplification period, the switches 54 of row 1 are returned to their initial position connected to the shift register stages and the switch 52-1 is shifted to the third position to connect the planar electrode 16-1 to ground. The same process is repeated row-by-row. This is, after each write in interval for a row, there is amplification (which can take place for up to almost one frame time) of the information written into the row, until one entire field has been written into the display. Then the same process is repeated for the next field.

If desired, a more complex array then described may be provided by interleaving with the array of FIG. 9 an identical second array to provide interlace. When operating this more complex array, alternate rows of the composite array are loaded during one field time and the remaining rows during the following field time, the two interlaced fields thereby forming one frame.

Figure 4:
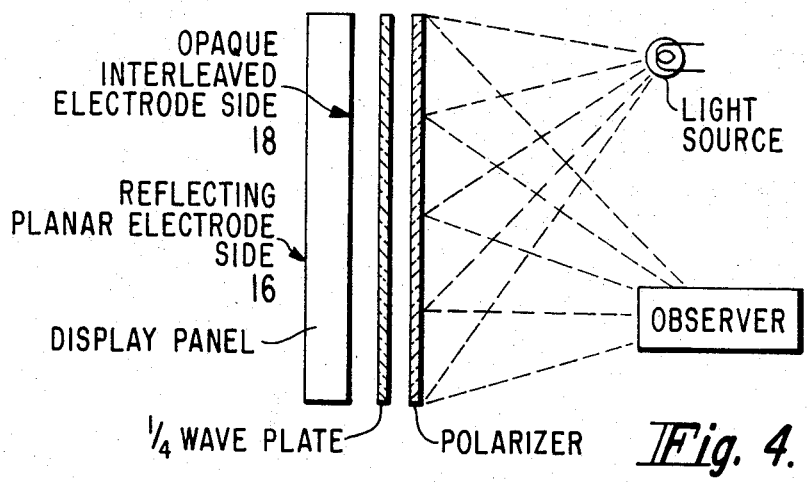

It already has been mentioned that the arrays of the present application may be operated in the transmission mode as illustrated in FIG. 3. As an alternative, they may be operated in the reflection mode as illustrated schematically in FIG. 4. When operating in the transmission mode, planar electrodes (or electrode) are transparent and may be on the side of the display panel observer. When operating in the reflecting mode, the planar electrode or electrodes are on the side of the display panel facing away from the observer and are formed of a reflecting material.

In both the transmissive and reflective modes of operation, it is useful if the interleaved electrodes be opaque. The reason is that the electric field of interest, that is, the $E_x$ field, must be substantially orthogonal to the $E_y$ field. In the spaces between the interleaved electrodes, this is the case, that is, the $E_x$ field present in this region has its major component in the plane of the liquid crystal layer. However, in the region over that occupied by the interleaved electrodes, there is a substantial portion of the electric field produced by the interleaved electrodes which may not be parallel to the plane of the liquid crystal layer. In this region, the optical effects are not readily controllable and do not follow the rules which have been discussed at length above. Making the interleaving electrodes opaque masks from the observer what occurs in the liquid crystal regions between the opaque electrodes and the planar electrodes 16. Accordingly, the opaque interleaved electrodes have the effect of acting as an aperture for the light, that is, they permit the viewer to see only the regions of the liquid crystal where orthogonal fields, which are independently controllable, are present.

The effect above may be enhanced by placing on one of the surfaces of the glass plates a mask which is of the same general shape as, but slightly larger than the interleaved electrodes. The edges of this mask slightly overlap the edges of the electrodes to cut down somewhat the size of the apertures through which the liquid crystal may be viewed.

Figure 10:
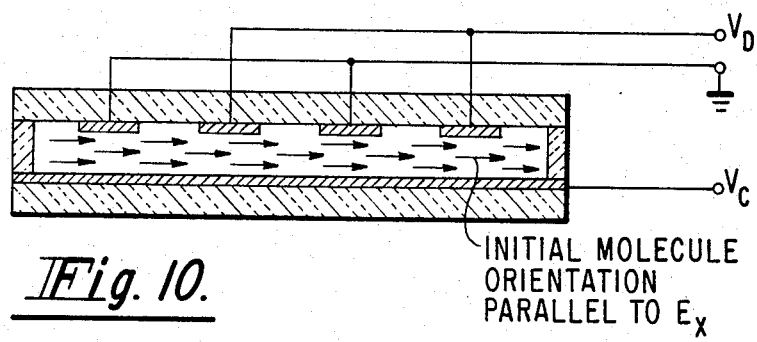
FIG. 10 is a section through a liquid crystal cell according to another embodiment of the invention.

In the embodiments of the invention discussed to this point, the liquid crystal cell employed is the one shown in FIGS. 1 and 2. This cell includes an interleaved electrode structure 18, 20, at one surface of the liquid crystal and a planar electrode 16 at the other surface of the liquid crystal. The liquid crystal molecules initially are oriented perpendicular to the plane of the film. A number of other alternatives are available. For example, using the same structure as already illustrated, the liquid crystal molecules initially may be oriented in the plane of the film, that is, parallel to the electric field $E_x$ as shown schematically in FIG. 10. Now the functions of $E_x$ and $E_y$ are reversed.

Figure 11A:
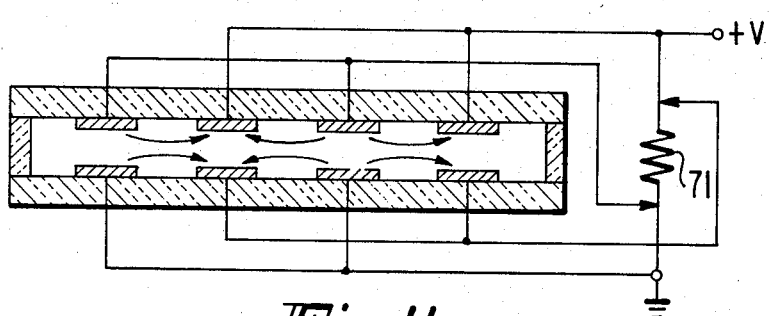
FIGS. 11a and 11b are sections through still another embodiment of the invention.
Figure 11B:
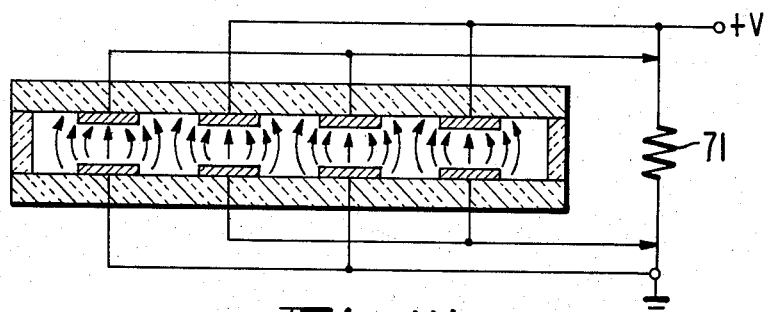

An alternative structure is shown in FIGS. 11a and 11b. This one employs two sets of interleaving electrodes, one at one surface of the liquid crystal and the other at the opposite surface of the liquid crystal. The interleaving fingers of the two sets of electrodes are aligned. In operation, a lateral field may be produced in the manner illustrated in the FIG. 11a, that is, by placing one electrode of each set at voltage $+V$ and the other at ground. The electric field $E_x$ is maximum as illustrated by the arrows and the electric field $E_y$ is minimum. The other limiting case is illustrated in FIG. 11b. Here all of the upper electrodes are placed at a voltage $+V$ and all of the lower electrodes are at ground. Now the lateral field component $E_x$ is close to zero and the Y field component $E_y$ is at its maximum value as shown by the arrows in FIG. 11a. By selecting for the various electrodes values of voltage between zero and $+V$, for example, by means of the potentiometer 71, net field orientations between directions parallel to the film and perpendicular to the film may be obtained.

Figure 12:
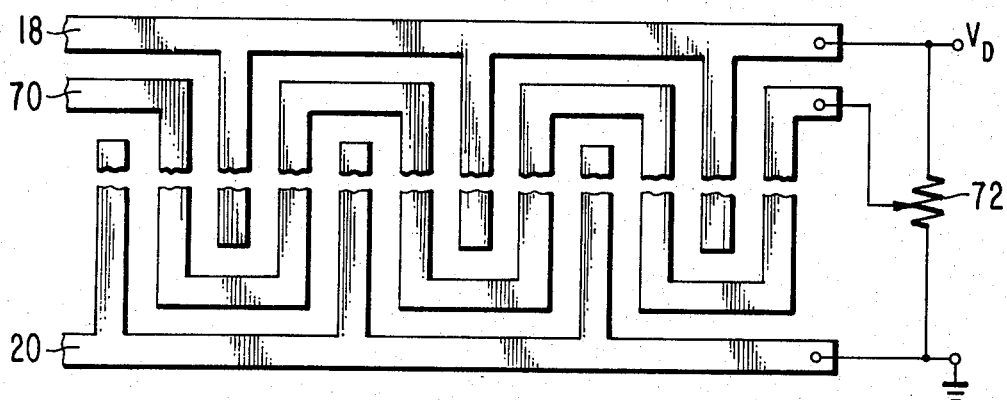
FIGS. 12 and 13 are plan views of modified electrode structures of other embodiments of the invention.

FIG. 12 illustrates an embodiment of the invention in which a more uniform $E_x$ field is obtained then in the embodiments already discussed. The electrode structure illustrated in FIG. 12 is at one surface of the film and includes two interleaving parts 18 and 20 just as in FIG. 1. (They are shown broken away to imply, as is the case, that their length dimension is much much longer than that illustrated.) In addition, there is a third electrode 70 located mid-way between the two interleaving electrodes. This third electrode is maintained at a potential between $V_D$ and ground and this potential may be obtained from a resistive voltage divider 72. In general, this voltage will be close to $V_D/2$ although in some circumstances it may not be exactly this value. The second electrode (not shown) for the cell of the FIG. 12 may be a planar electrode such as 16 of FIG. 1 and it is located at the opposite surface of the liquid crystal. Electrodes such as shown in FIG. 12 also may be employed in the embodiments of FIGS. 10, 11a and 11b.

Figure 13:
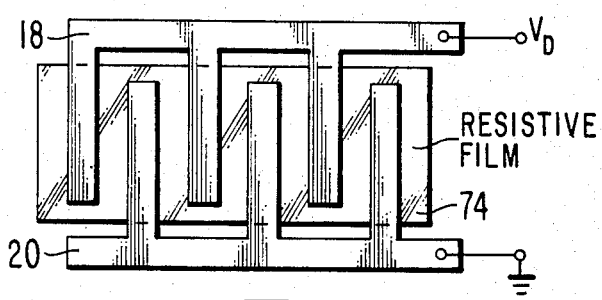

Another means for obtaining a more uniform field $E_x$ is illustrated in FIG. 13. It comprises a resistive film 74, such as one formed of tin oxide, located on the same surface of the liquid crystal as the interleaved electrode structure 18, 20 and in conductive contact with this structure. When the voltage $V_D$ is applied to electrode portion 18 and the other electrode portion 20 is connected to ground, a fairly uniform voltage drop occurs across the resistive film between each pair of adjacent fingers. The field $E_x$ produced is correspondingly uniform.

Figure 14:
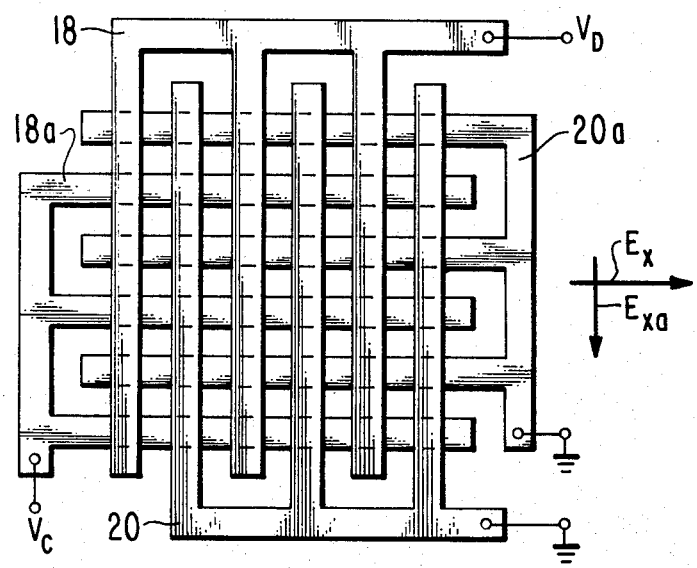
FIGS. 14 and 15 are plan and cross-section views respectively of a liquid crystal cell according to still another embodiment of the invention.
Figure 15:
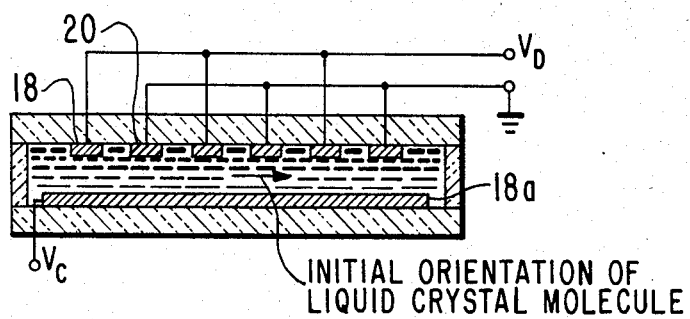

The cells shown in FIGS. 14 and 15 include one set of interleaving electrodes 18, 20 at one surface of the liquid crystal and another set of interleaving electrodes 18a, 20a at the other surface of the liquid crystal. The fingers of interleaving electrode structure 18, 20 extend in one direction and the fingers of interleaving electrode structure 18a, 20a extend in a direction orthogonal to this first direction.

In the operation of the cell of FIG. 14, each set of electrodes produces an electric field which lies in the plane of the liquid crystal layer. However, the electric field $E_x$ produced by the electrode structure 18, 20 is orthogonal to the electric field $E_{xa}$ produced by the electrode structure 18a, 20a. This is indicated by the arrows so legended in FIG. 14. The surfaces of the glass plates are treated in such a way that the initial orientation of the liquid crystal molecules is in the plane of the liquid crystal layer (as in FIG. 10) and parallel to one of the field directions $E_x$ or $E_{xa}$.

While in the embodiments of the invention discussed above, a liquid crystal which exhibits positive dielectric anisotropy was assumed, that is $\epsilon_a > 0$, the principles are equally applicable to materials which exhibit negative dielectric anisotropy ($\epsilon_a < 0$). With these latter materials, of course, the roles played by the $E_x$ and $E_y$ fields are reversed.

What is claimed is:

1. A method of operating a dielectrically anisotropic liquid crystal comprising the steps of:
   applying to the liquid crystal a non-zero electric field $Ey$ having its major component in a given direction;
   concurrently applying to the liquid crystal a non-zero electric field $Ex$ having its major component in a direction orthogonal to said given direction; and
   independently controlling the amplitudes of the $Ex$ and $Ey$ fields.

2. A method as set forth in claim 1 wherein one of said fields is applied in a direction parallel to the initial direction of alignment of the molecules of said liquid crystal and the other field perpendicular thereto.

3. A method as set forth in claim 2 wherein said liquid crystal is in the form of a thin layer, wherein said electric field $Ey$ has a principal component perpendicular to the layer surface, and wherein said electric field $Ex$ has a principal component in the plane of the layer.

4. A method as set forth in claim 2 wherein said liquid crystal is in the form of a thin layer, and wherein said electric fields $Ex$ and $Ey$ both have their principal component in the plane of said layer.

5. The method of claim 2, further including the steps of:
   removing both fields after applying both fields at non-zero levels for a relatively short interval of time; and
   then reapplying said other field while said one field is absent.

6. A method of operating a field effect type nematic liquid crystal display which includes a layer of said liquid crystal material in which the liquid crystal molecules initially are oriented perpendicularly to the plane of the layer comprising the steps of:
   applying a non-zero electric field $Ey$ to the layer having a principal component oriented perpendicularly of the plane of layer;
   concurrently applying a non-zero electric field $Ex$ to the layer having a principal component lying in the plane of the layer; and
   independently controlling the amplitudes of $Ex$ and $Ey$.

7. The method of claim 6, further including the steps of:
   removing both fields after applying both fields at non-zero levels for a relatively short interval of time; and
   then reapplying a field in the same direction as the previous field $Ex$, while the field $Ey$ is absent.

8. A method of operating a field effect liquid crystal of the nematic type which is arranged in a relatively thin layer and with the liquid crystal molecules initially at an angle $\phi \cong 0$ to axes perpendicular to the plane of the layer comprising the steps of:
   pulsing the liquid crystal with concurrent non-zero electric fields $Ex$ and $Ey$, the field $Ex$ lying in the plane of the liquid crystal layer and the field $Ey$ being orthogonal thereto, to thereby change the angle $\phi$ from substantially zero to some small value $\phi_1$; and
   then reapplying a field in the same direction as the pulsed field $Ex$ to the liquid crystal in the absence of the field $Ey$, whereby the angle $\phi_1$ at the central part of the layer increases exponentially as a function of the time during which the reapplied field is applied in the absence of the field $Ey$.

9. A liquid crystal display comprising, in combination:
   a field-effect nematic liquid crystal layer;
   a first electrode structure at one surface of the layer;
   an interleaved second electrode structure lying parallel to the first electrode structure within the liquid crystal layer adjacent to the other surface of the liquid crystal layer, said second electrode structure comprising two physically separate conductors, both formed with extending fingers, the fingers of one conductor interleaved with those of the other;
   means for applying a non-zero difference in voltage between the conductors of said interleaved electrode structure for creating an electric field $Ex$ in the plane of the liquid crystal layer; and
   means for concurrently and independently applying a non-zero difference in voltage between the first electrode structure and at least one of said conductors for creating an electric field $Ey$ which is orthogonal to $Ex$.

10. A liquid crystal display as set forth in claim 9 wherein said first electrode structure comprises a single planar conductor.

11. A liquid crystal display as set forth in claim 9 wherein said first electrode structure comprises an interleaved electrode structure which includes two conductors, each formed with extending fingers, the fingers of one conductor interleaved with those of the other.

12. A liquid crystal display as set forth in claim 11 wherein said fingers of said first electrode structure lie substantially parallel to those of said second electrode structure.

13. A liquid crystal display as set forth in claim 11 wherein said fingers of said first electrode structure extend in a direction substantially perpendicularly to the direction in which the fingers of said second electrode structure extend.

14. A liquid crystal display comprising, in combination:
   a field-effect nematic liquid crystal layer;
   a first electrode structure at one surface of the layer;

an interleaved second electrode structure lying parallel to the first electrode structure within the liquid crystal layer adjacent to the other surface of the liquid crystal layer, said second electrode structure comprising two physically separate conductors, both formed with extending fingers, the fingers of one conductor interleaved with those of the other;

means for applying a difference in voltage between the conductors of said interleaved electrode structure for creating an electric field $Ex$ in the plane of the liquid crystal layer;

means for independently applying a difference in voltage between the first electrode structure and at least one of said conductors for creating an electric field $Ey$ which is orthogonal to $Ex$;

a third conductor lying in the same plane as said second electrode structure, located between the interleaving fingers thereof and spaced from said fingers; and means for maintaining said third conductor at a potential in the range between that applied to said one conductor of said interleaved structure and that applied to the other conductor of said interleaved structure.

15. A liquid crystal display comprising, in combination:

a field-effect nematic liquid crystal layer;

a first electrode structure at one surface of the layer;

an interleaved second electrode structure lying parallel to the first electrode structure within the liquid crystal layer adjacent to the other surface of the liquid crystal layer, said second electrode structure comprising two physically separate conductors, both formed with extending fingers, the fingers of one conductor interleaved with those of the other;

means for applying a difference in voltage between the conductors of said interleaved electrode structure for creating an electric field $Ex$ in the plane of the liquid crystal layer;

means for independently applying a difference in voltage between the first electrode structure and at least one of said conductors for creating an electric field $Ey$ which is orthogonal to $Ex$; and a planar resistive layer in contact with the fingers of said interleaved structure for improving the linearity of the electric field $Ex$.

16. A liquid crystal display comprising, in combination:

a field-effect nematic liquid crystal layer;

an interleaved first electrode structure at one surface of the layer, said structure comprising two conductors, each formed with extending fingers, the fingers of one conductor interleaved with those of the other;

an interleaved second electrode structure lying parallel to the first electrode structure within the liquid crystal layer adjacent to the other surface of the liquid crystal layer, said second electrode structure comprising two physically separate conductors, both formed with extending fingers, the fingers of one conductor interleaved with those of the other, said fingers of said second electrode structure extending in a direction substantially perpendicular to the direction in which the fingers of said first electrode structure extend;

means for applying a difference in voltage between the conductors of said first interleaved electrode structure for creating an electric field $Ex$ in the plane of the liquid crystal layer; and means for independently applying a difference in voltage between the conductors of the interleaved second electrode structure for creating an electric field $Exa$ which is orthogonal to $Ex$ and which also is in the plane of the liquid crystal layer.

17. A liquid crystal display as set forth in claim 16 wherein said means for independently applying a difference in voltage comprises means for doing so concurrently with the application of said difference in voltage between the conductors of said first interleaved electrode structure.

* * * * *